United States Patent
Brunner et al.

(10) Patent No.: US 11,225,582 B2
(45) Date of Patent: *Jan. 18, 2022

(54) WATER SOLUBLE POLYMER COMPOSITIONS

(71) Applicant: Infinite Material Solutions, LLC, Prescott, WI (US)

(72) Inventors: Philip Brunner, Hudson, WI (US); Gavriel DePrenger-Gottfried, Hudson, WI (US); Nathan Ockwig, Eagan, MN (US)

(73) Assignee: Infinite Material Solutions, LLC, Prescott, WI (US)

( * ) Notice: Subject to any disclaimer, the term of this patent is extended or adjusted under 35 U.S.C. 154(b) by 45 days.

This patent is subject to a terminal disclaimer.

(21) Appl. No.: 16/526,659

(22) Filed: Jul. 30, 2019

(65) Prior Publication Data

US 2019/0359839 A1  Nov. 28, 2019

Related U.S. Application Data

(63) Continuation of application No. 15/990,234, filed on May 25, 2018, now Pat. No. 10,435,576.

(Continued)

(51) Int. Cl.
| | |
|---|---|
| *B32B 3/10* | (2006.01) |
| *C09D 11/38* | (2014.01) |
| *C08K 5/1535* | (2006.01) |
| *B33Y 70/00* | (2020.01) |
| *B29C 64/40* | (2017.01) |
| *C09D 11/102* | (2014.01) |
| *C09D 11/106* | (2014.01) |
| *C09D 11/14* | (2006.01) |

(Continued)

(52) U.S. Cl.
CPC .............. *C09D 11/38* (2013.01); *B29C 64/40* (2017.08); *B33Y 70/00* (2014.12); *C08K 5/1535* (2013.01); *C09D 11/102* (2013.01); *C09D 11/106* (2013.01); *C09D 11/14* (2013.01); *B29K 2029/00* (2013.01); *B29K 2995/0062* (2013.01); *B33Y 80/00* (2014.12)

(58) Field of Classification Search
None
See application file for complete search history.

(56) References Cited

U.S. PATENT DOCUMENTS

| | | | |
|---|---|---|---|
| 3,288,770 | A | 11/1966 | Butler |
| 3,556,932 | A | 1/1971 | Anthony et al. |

(Continued)

FOREIGN PATENT DOCUMENTS

| | | |
|---|---|---|
| CN | 101506291 A | 8/2009 |
| CN | 102892815 A | 1/2013 |

(Continued)

OTHER PUBLICATIONS

Chia et al., "Recent advances in 3D printing of biomaterials," *Journal of Biological Engineering*, 2015, 9:4 (14 pgs).

(Continued)

*Primary Examiner* — Christopher M Polley
(74) *Attorney, Agent, or Firm* — Madison C. Makeever

(57) ABSTRACT

A water soluble polymer composition includes a water soluble polymer and a sugar and may be used as a support in additive manufacturing processes.

18 Claims, 5 Drawing Sheets

Related U.S. Application Data

(60) Provisional application No. 62/511,585, filed on May 26, 2017.

(51) Int. Cl.
  *B33Y 80/00* (2015.01)
  *B29K 29/00* (2006.01)

(56) References Cited

U.S. PATENT DOCUMENTS

| | | |
|---|---|---|
| 5,121,329 A | 6/1992 | Crump |
| 5,503,785 A | 4/1996 | Serdy et al. |
| 5,518,680 A | 5/1996 | Cima et al. |
| 5,603,884 A | 2/1997 | DuCharme, Jr. et al. |
| 5,869,170 A | 2/1999 | Cima et al. |
| 5,993,716 A | 11/1999 | Draenert |
| 6,070,107 A | 5/2000 | Lombardi et al. |
| 6,228,923 B1 | 5/2001 | Lombardi et al. |
| 6,235,816 B1 | 5/2001 | Lorcks et al. |
| 6,547,994 B1 | 4/2003 | Monkhouse et al. |
| 6,585,930 B2 | 7/2003 | Liu et al. |
| 6,673,285 B2 | 1/2004 | Ma |
| 6,790,403 B1 | 9/2004 | Priedeman, Jr. et al. |
| 7,087,200 B2 | 8/2006 | Taboas et al. |
| 7,300,668 B2 | 11/2007 | Pryce Lewis et al. |
| 7,332,537 B2 | 2/2008 | Bredt et al. |
| 7,354,605 B2 | 4/2008 | Trogolo et al. |
| 7,569,273 B2 | 8/2009 | Bredt et al. |
| 7,790,061 B2 | 9/2010 | Gratson et al. |
| 7,795,349 B2 | 9/2010 | Bredt et al. |
| 7,815,826 B2 | 10/2010 | Serdy et al. |
| 7,875,290 B2 | 1/2011 | Payumo et al. |
| 7,905,951 B2 | 3/2011 | Williams |
| 7,931,914 B2 | 4/2011 | Lewis et al. |
| 8,013,042 B2 | 9/2011 | Ito |
| 8,080,511 B2 | 12/2011 | Dreyer et al. |
| 8,404,171 B2 | 3/2013 | Heenan |
| 8,470,231 B1 | 6/2013 | Dikovsky et al. |
| 8,685,296 B2 | 4/2014 | Liu et al. |
| 8,715,436 B2 | 5/2014 | Bhatia et al. |
| 8,822,590 B2 | 9/2014 | Hermes et al. |
| 9,114,032 B1 | 8/2015 | Pulugurtha |
| 9,347,037 B2 | 5/2016 | Masutani et al. |
| 9,381,154 B2 | 7/2016 | Zhou et al. |
| 9,381,564 B2 | 7/2016 | McGuire et al. |
| 9,388,078 B2 | 7/2016 | Rael |
| 9,458,357 B2 | 10/2016 | Bellan et al. |
| 9,463,160 B2 | 10/2016 | Yoo et al. |
| 9,630,365 B2 | 4/2017 | Ne et al. |
| 9,707,717 B2 | 7/2017 | Sand |
| 9,744,722 B2 | 8/2017 | Rodgers |
| 9,745,458 B2 | 8/2017 | Smith, Jr. et al. |
| 9,856,390 B2 | 1/2018 | Bredt et al. |
| 10,144,810 B2 | 12/2018 | Carrier et al. |
| 10,624,750 B2 | 4/2020 | Castro et al. |
| 2003/0114936 A1 | 6/2003 | Sherwood et al. |
| 2004/0038009 A1 | 2/2004 | Leyden et al. |
| 2004/0161544 A1 | 8/2004 | Kasperchik |
| 2005/0017394 A1 | 1/2005 | Hochsmann et al. |
| 2005/0059757 A1 | 3/2005 | Bredt et al. |
| 2005/0281856 A1 | 12/2005 | McGlohorn et al. |
| 2006/0018942 A1 | 1/2006 | Rowe et al. |
| 2006/0230984 A1 | 10/2006 | Bredt et al. |
| 2007/0182070 A1 | 8/2007 | Monsheimer et al. |
| 2007/0241482 A1 | 10/2007 | Giller et al. |
| 2010/0273667 A1 | 10/2010 | Kotov et al. |
| 2011/0024939 A1 | 2/2011 | Alves |
| 2011/0236465 A1* | 9/2011 | Hall .................. A61K 31/192 424/443 |
| 2012/0040581 A1 | 2/2012 | Kim |
| 2015/0086606 A1 | 3/2015 | Cabrera et al. |
| 2015/0165020 A1 | 6/2015 | Jaklenec et al. |
| 2015/0273572 A1 | 10/2015 | Ederer et al. |
| 2015/0290280 A1 | 10/2015 | Petrak et al. |
| 2015/0374450 A1 | 12/2015 | Mansfield et al. |
| 2015/0375419 A1 | 12/2015 | Günther et al. |
| 2016/0038655 A1 | 2/2016 | Weisman et al. |
| 2016/0046832 A1 | 2/2016 | Wroblesky et al. |
| 2016/0066601 A1 | 3/2016 | Herr et al. |
| 2016/0068678 A1 | 3/2016 | Luo et al. |
| 2016/0102279 A1 | 4/2016 | Labeque et al. |
| 2016/0193651 A1 | 7/2016 | Orange et al. |
| 2016/0200044 A1 | 7/2016 | Voit et al. |
| 2016/0281267 A1 | 9/2016 | Wetzel et al. |
| 2016/0289415 A1 | 10/2016 | Okashimo et al. |
| 2016/0297131 A1 | 10/2016 | Kameoka et al. |
| 2016/0333165 A1 | 11/2016 | Bayer et al. |
| 2017/0008072 A1 | 1/2017 | Cui et al. |
| 2017/0015063 A1 | 1/2017 | Hanyu et al. |
| 2017/0022341 A1 | 1/2017 | Bayer et al. |
| 2017/0024501 A1 | 1/2017 | Greyf et al. |
| 2017/0058142 A1 | 3/2017 | Vicari et al. |
| 2017/0079262 A1 | 3/2017 | Rowley et al. |
| 2017/0081500 A1 | 3/2017 | Bredt et al. |
| 2017/0088656 A1 | 3/2017 | Sun |
| 2017/0106595 A1 | 4/2017 | Günther et al. |
| 2017/0120533 A1 | 5/2017 | Saito et al. |
| 2017/0197365 A1 | 7/2017 | Sugiyama et al. |
| 2017/0210037 A1 | 7/2017 | Ederer et al. |
| 2017/0218228 A1 | 8/2017 | Jose et al. |
| 2017/0259482 A1 | 9/2017 | Contractor |
| 2017/0260359 A1 | 9/2017 | Hanyu et al. |
| 2017/0274600 A1 | 9/2017 | Sugiyama et al. |
| 2017/0283596 A1* | 10/2017 | Saito .................. B33Y 10/00 |
| 2017/0291327 A1 | 10/2017 | Rothfuss |
| 2017/0312388 A1 | 11/2017 | Shoseyov et al. |
| 2017/0348458 A1 | 12/2017 | Kesti et al. |
| 2017/0348462 A1 | 12/2017 | Lao et al. |
| 2018/0020691 A1 | 1/2018 | Aydin et al. |
| 2018/0022023 A1 | 1/2018 | Therriault et al. |
| 2018/0049464 A1 | 2/2018 | Zhang et al. |

FOREIGN PATENT DOCUMENTS

| | | |
|---|---|---|
| CN | 104693474 A | 6/2015 |
| CN | 105034369 A | 11/2015 |
| CN | 105209944 A | 12/2015 |
| CN | 106279817 A | 1/2017 |
| DE | 102013011243 | 1/2015 |
| EP | 0691194 A1 | 1/1996 |
| EP | 1594677 B1 | 7/2007 |
| EP | 1638758 B1 | 8/2009 |
| GB | 2 392 446 A | 3/2004 |
| WO | WO 2017/019393 A1 | 2/2017 |

OTHER PUBLICATIONS

Curvelo et al., "Thermoplastic starch—cellulosic fibers composites: preliminary results," *Carbohydrate Polymers*, Jun. 2001, vol. 45, Issue 2 (pp. 183-188).

He et al., "Printing 3D microfluidic chips with a 3D sugar printer," *Microfluidics and Nanofluidics*, Aug. 2015, vol. 19, Issue 2, (pp. 447-456).

International Search Report and Written Opinion for Application No. PCT/US2018/034738, dated Sep. 4, 2018 (12 pgs).

Ligon et al. "Polymers for 3D Printing and Customized Additive Manufacturing," *Chem. Rev.*, 2017, 117 (15) (pp. 10212-10290).

Mohan, "Water-soluble, biodegradable polymer introduced," GreenerPackage.com, [http://www.greenerpackage.com/resins/water-soluble_biodegradable polymer introduced], Jun. 8, 2009 (2 pgs).

Markstedt et al., "3D Bioprinting Human Chondrocytes with Nanocellulose-Alginate Bioink for Catilage Tissue Engineering Applications." Biomacromolecules, 2015, 16(5) (pp. 1489-1496)(Abstract only—2 pgs.).

"Nichigo G-Polymer® Biodegradable, High Barrier, Water Soluble, Extrusion Polymer," 2010 Place Conference, Apr. 18-21, 2010, Albuquerque, New Mexico (50 pgs).

Nippon Gohsei: "Brandnew Water Soluble Filament for 3D printer," Jan. 1, 2016, Retrieved from the Internet: [URL:http://www.nippon-gohsei.com/cache/downloads/7m5hyk0hclwkc08cg8k40occ4/MELFIL%20Brochure%202016%20English.pdf] Retrieved on Aug. 22, 2018 (2 pgs).

(56) References Cited

OTHER PUBLICATIONS

Pfister et al., "Biofunctional rapid prototyping for tissue-engineering applications: 3D bioplotting versus 3D printing," *Journal of Polymer Science: Part A: Polymer Chemistry*, 2004, vol. 42, (pp. 624-638).
Press Releases, "Verbatim Unveils Two new 3D Printing Filaments," Accessed at 3printr.com [https://www.3printr.com/verbatim-unveils-three-new-3d-printing-filaments-1042725/]. Published Sep. 27, 2016 (4 pgs.).
Radhakrishnan et al., "Injectable and 3D Bioprinted Polysaccharide Hydrogels: From Cartilage to Osteochondral Tissue Engineering," *Biomacromolecules*, 2017, 18(1), pp. 1-26 (Abstract only—2pgs.).
"Soarus LLC's New Nichigo G-Polymer," Design News, Materials & Assembly, May 27, 2009 (6 pgs.).
Swager, "Biodegradable High Barrier for Packaging," *bioplastics* Magazine, vol. 4, 2009, Published Aug. 2, 2009, Accessed at [https://issuu.com/bioplastics/docs/bioplasticsmagazine_0904] (pp. 30-31, 1 pg).
First Office Action for Chinese Application No. 201880034382.6, dated Apr. 26, 2021.

\* cited by examiner

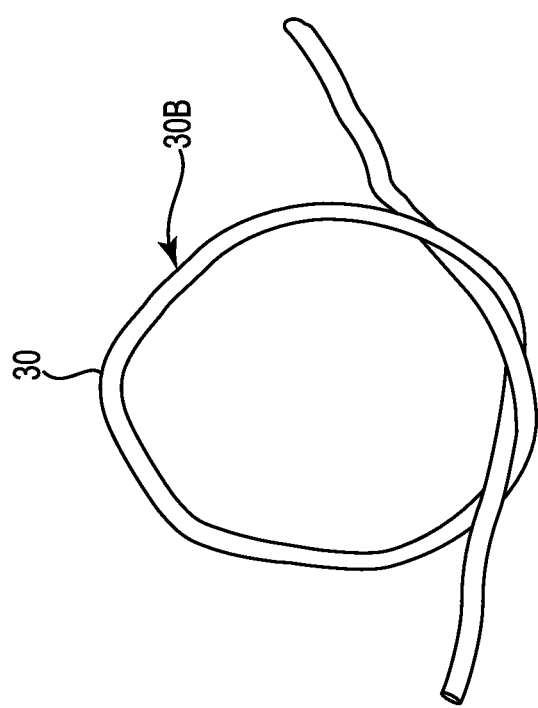

WATER SOLUBLE POLYMER COMPOSITIONS

CROSS-REFERENCE TO RELATED APPLICATION

This application is a continuation of application Ser. No. 15/990,234 filed May 25, 2018, which claims the benefit of U.S. Provisional Application No. 62/511,585 filed May 26, 2017, each of which is hereby fully incorporated herein by reference.

TECHNICAL FIELD

This disclosure relates to compositions and methods for producing and using water soluble polymer compositions.

BACKGROUND

Additive manufacturing processes, commonly referred to as three-dimensional (3D) printing, can be used to construct desired objects with possible applications in numerous industries (e.g., aerospace, automotive, medical, etc). Exemplary processes include, but are not limited to, electron beam melting (EBM), fused deposition modeling (FDM), ink jetting, laminated object manufacturing (LOM), selective laser sintering (SLS), and stereolithography (SL). Using such processes, a desired object can be modeled in a computer-aided design (CAD) package and printed using a selected build material. For deposition based methods, like FDM, the selected build material is typically extruded through a heated printer in a layered manner according to computer instruction. Printing in commercially available additive manufacturing devices, like, for example, the ARBURG™ Freeformer system, often occurs in a build chamber that can provide desired heating and temperature control based on the selected build material.

Many additive manufacturing techniques use support layers or structures to build a desired object. The limited availability of suitable support methods, materials, and structures, however, has restricted printing to certain design types. The most basic support method uses the same material for support as it does for the printed object, as, for example, shown in U.S. Pat. Nos. 6,228,923, 6,790,403 and 8,404,171. With this technique, the support is erected similarly to scaffolding on a building and "props up" any steeply angled overhangs or spans. Referred to as "breakable" or "raft" support, this type of support can be effective, but can also be messy, time-consuming, and difficult to remove by mechanical breakage or trimming. It is not unusual to spend hours cleaning or cutting away support material from a 3D-printed object using razor blades, scalpels, sandpaper, and even power tools. Methods using different support and printed materials can also be problematic. For example, certain hydrophobic polymers (e.g., polypropylene) are nearly impossible to print due to the incompatibility between the support materials and the 3D-printed base resin.

The inability to remove internal support materials can further restrict object design types. Some external geometries can make it difficult, if not impossible, to remove internal support material. For years, many have tried to solve this problem with support structures that are supposed to dissolve in very hot water, highly acidic or basic conditions, organic solvents, or various other chemicals. These products are often messy and even dangerous—and in general have been unsuccessful.

SUMMARY

Surprisingly, water soluble polymer compositions, including a water soluble polymer (e.g., butenediol vinylalcohol copolymer (BVOH)) and a sugar (e.g., trehalose), can solve several additive manufacturing problems: such compositions can dissolve in room temperature water, at neutral pH, can be compatible with both hydrophilic and hydrophobic polymers, and can be used as a support material for build chamber temperatures above 140° C., which may, for example, be desirable when printing high temperature thermoplastics.

The advantages of water soluble polymer compositions are unexpected. Water soluble polymers are often brittle and thus not suited for use in conventional filament type additive manufacturing techniques. Some have tried to address this issue by using plasticizers, but this can dramatically reduce the temperature resistance of water soluble polymers, which can markedly limit the availability of water soluble polymers as a support material and thus the type of build materials that can be printed. Likewise, sugars, while often highly water soluble, tend to be brittle at room temperature and have low melt viscosity. Using current equipment and practices, sugars cannot be extruded into useful filaments. Furthermore, most sugars are heat sensitive and caramelize or degrade above melting temperatures, making sustained extrusion impractical or impossible.

The present disclosure shows that water soluble polymers and sugars can be substantially compatible. Water soluble polymer compositions including a water soluble polymer and a sugar can exhibit improved stiffness at higher temperatures and improved rheological properties. The addition of a sugar to a water soluble polymer can also provide a tackifying effect, offering improved adhesion of the composition to a variety of substrates (e.g., a build plate). Without intending to be limited by theory, the sugar may be imparting pressure sensitive characteristics to facilitate improved adhesion at printing temperatures, as described by the Dahlquist Criterion.

Accordingly, in one embodiment, a water soluble polymer composition includes a water soluble polymer and a sugar. In another embodiment, a water soluble polymer composition includes a continuous water soluble polymeric phase and a sugar dispersed throughout the continuous water soluble polymeric phase. In some embodiments, the water soluble polymer composition can also include one or more polymers or additives. In another embodiment, an article includes a continuous polymeric phase with a water soluble polymer composition that further includes a water soluble polymer, a sugar, and an additive material dispersed throughout the continuous polymeric phase.

In another embodiment, a method includes providing a water soluble polymer and a sugar, mixing the water soluble polymer and the sugar, and melt processing the water soluble polymer and sugar mixture. In another embodiment, a method of using a water soluble polymer composition includes providing the above-described water soluble polymer composition, melt processing the water soluble polymer composition, and printing the water soluble polymer composition into a desired object. In another embodiment, a method of making a water soluble polymer composition filament includes melt processing a water soluble polymer and a sugar to provide a water soluble polymer composition, cooling the water soluble polymer composition, and drawing down the water soluble polymer composition. In another embodiment, a method of using a water soluble polymer composition that includes a water soluble polymer and a sugar as a filament in fused deposition modeling includes forming a filament that contains the above-described water soluble polymer composition.

In other embodiments, a water soluble polymer composition support system includes an additive manufacturing device having a build chamber, the build chamber having a build chamber temperature; a printed object having a desired shape, the printed object comprising a high temperature thermoplastic build material; and one or more supports positioned about the printed object, the one or more supports comprising a water soluble polymer composition; wherein the build chamber temperature can reach at least about 140° C.

In other embodiments, a three-dimensional printed article includes a three-dimensional printed object generally disposed on a substantially horizontal build plate; and one or more soluble supports positioned about and supporting one or more portions of the three-dimensional printed object, the soluble supports comprising a water soluble polymer composition.

The above summary is not intended to describe each disclosed embodiment or every implementation. The detailed description that follows more particularly exemplifies illustrative embodiments.

BRIEF DESCRIPTION OF THE DRAWINGS

FIG. 4B shows the filament of FIG. 4A after stretching.

DETAILED DESCRIPTION

Figure 1:
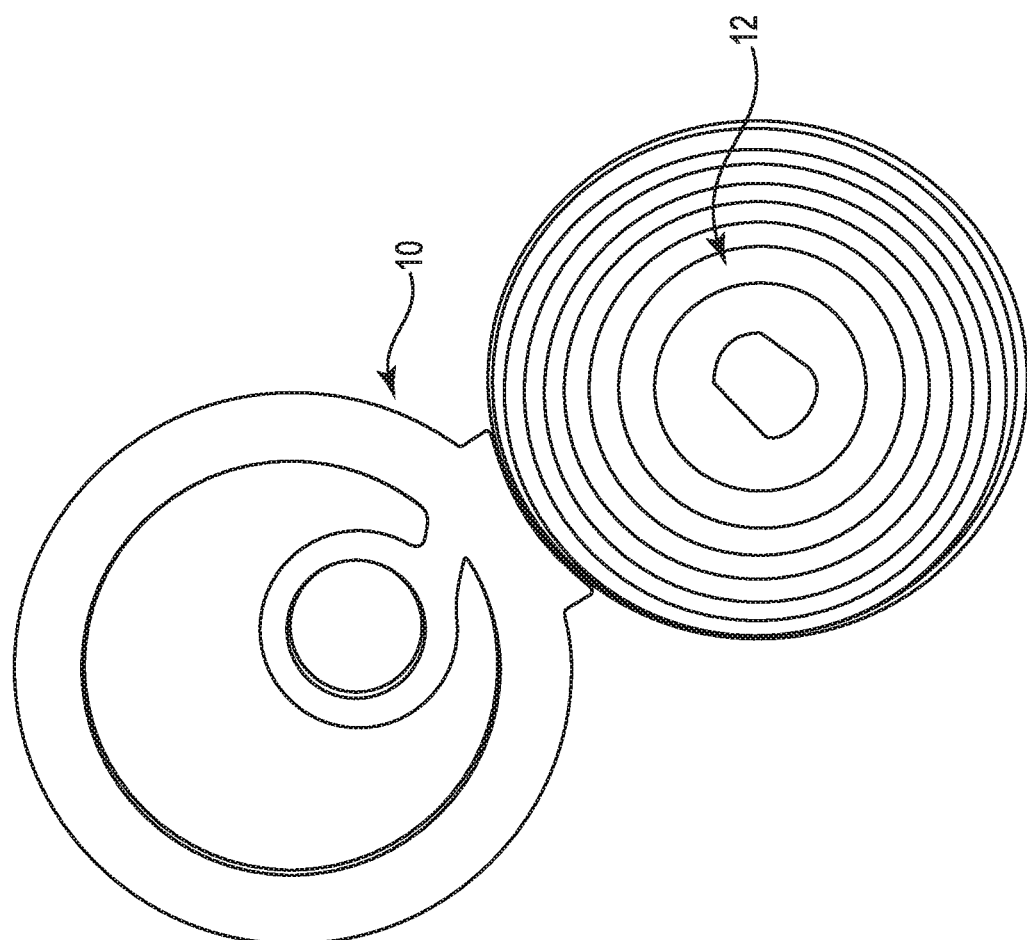
FIG. 1 illustrates a butenediol vinylalcohol copolymer (BVOH), a water soluble polymer, and trehalose composition, three-dimensionally printed on a standard acrylonitrile butadiene styrene (ABS) and nylon build plate.

Unless the context indicates otherwise the following terms shall have the following meaning and shall be applicable to the singular and plural:

The terms "a," "an," "the," "at least one," and "one or more" are used interchangeably. Thus, for example, a water soluble polymeric composition containing "a" water soluble polymer means that the water soluble polymeric composition may include "one or more" water soluble polymers.

The terms "additive manufacturing", "three-dimensional printing", or "3D printing" refer to any process used to create a three-dimensional object in which successive layers of material are formed under computer control (e.g., electron beam melting (EBM), fused deposition modeling (FDM), ink jetting, laminated object manufacturing (LOM), selective laser sintering (SLS), and stereolithography (SL)).

The term "build chamber" refers to a volume, often enclosed, in or utilized by an additive manufacturing device within which a desired component can be printed. A non-limiting example of build chamber can be found in an ARBURG™ Freeformer (commercially available from Arburg GmbH, Lossburg, Germany).

The term "build chamber temperature" refers to the temperature provided in a build chamber during additive manufacturing.

The term "build material" refers to a material that is printed in three dimensions using an additive manufacturing process to produce a desired object, often remaining after removal of a soluble support.

The term "build plate" refers to a substrate, often a removable film or sheet, that a build material or soluble support can be printed on.

The terms "disaccharide," "double sugar," or "biose" mean any class of sugars whose molecules contain two monosaccharide residues joined by a glycosidic linkage.

The terms "draw", "draw down", "drawn", "drawing", or "stretching" refer to the process of elongating an melt processed feedstock at temperatures near (within about 50° C.) the glass transition temperature of a polymeric composition.

The term "draw ratio" refers to the ratio of material thickness (e.g., filament diameter) before drawing to the material thickness after drawing.

The term "feedstock" refers to the form of a material that can be utilized in an additive manufacturing process (e.g., as a build material or soluble support). Non-limiting feedstock examples include, but are not limited to, pellets, powders, filaments, billets, liquids, sheets, shaped profiles, etc.

The term "high temperature thermoplastic" refers to a polymer or polymeric composition that is typically melt processed at or above about 220° C. Non-limiting examples of high temperature thermoplastics include, but are not limited to polycarbonate (PC), polyamides (Nylon), polyesters (PET), polyether ether ketone (PEEK) and polyetherimide (PEI).

The term "melt processing technique" means a technique for applying thermal and mechanical energy to reshape, blend, mix, or otherwise reform a polymer or composition, such as compounding, extrusion, injection molding, blow molding, rotomolding, or batch mixing.

The term "mixing" means to combine or put together to form one single substance, mass, or phase. This may include, but is not limited to, all physical blending methods, extrusion techniques, or solution methods.

The term "monosaccharide" means any simple sugars with multiple hydroxyl groups. Based on the number of carbons (e.g., 3, 4, 5, or 6), a monosaccharide can be a triose, tetrose, pentose, or hexose, etc.

The term "oligosaccharide" means a small number (e.g., 2 to 6 or 2 to 4) monosaccharide residues covalently linked.

The terms "polymer" and "polymeric" mean a molecule of high relative molecular mass, the structure of which essentially contains multiple repetitions of units derived, actually or conceptually, from molecules of low relative molecular mass.

The term "polymer composition" means a mixture of a water soluble polymer and a sugar.

The term "polysaccharide" means carbohydrate polymers containing chains of monosacchride and disaccharide units (e.g., starch, cellulose, glycrogen, etc.).

The terms "preferred" and "preferably" refer to embodiments that may afford certain benefits, under certain circumstances. Other embodiments, however, may also be preferred, under the same or other circumstances. Furthermore, the recitation of one or more preferred embodiments does not imply that other embodiments are not useful, and is not intended to exclude other embodiments from the claimed scope.

The term "semi-crystalline" refers to a polymeric composition polymeric composition with crystallinity greater than 5% but less than 90% as measured by differential scanning calorimetry (DSC).

The term "soluble support" or "soluble support material" refers to a material that is printed in three dimensions using an additive manufacturing process to physically support or brace the build material during printing and that can be removed by chemical salvation or dissolution as desired during or after the additive manufacturing process.

The term "substantially dry" means that the substance contains by weight about 15% or less volatiles, and preferably about 10% or less volatiles, at standard conditions based on the weight of the water soluble polymer composition.

The terms "substantially miscible" or "substantial miscibility" refer to the compatibility of materials in a blend (e.g., a water soluble polymer composition), such that the blend exhibits behavior expected of a single phase system, often shown by the blend having a single glass transition and/or melting temperature (e.g., when tested using differential scanning calorimetry).

The terms "substantially stable" or "substantial stability" refer to a material that largely exhibits dimensional stability (e.g., with minimal flow, melting, or deformation) at processing temperatures (e.g., a build chamber temperature).

The term "water soluble" means a material that absorbs, swells, dissolves, or deteriorates in the presence of water.

The term "water soluble polymer composition" refers to a composition that includes a water soluble polymer and a sugar.

The recitation of numerical ranges using endpoints includes all numbers subsumed within that range (e.g. 1 to 5 includes 1, 1.5, 3, 3.95, 4.2, 5, etc.).

Figure 2:
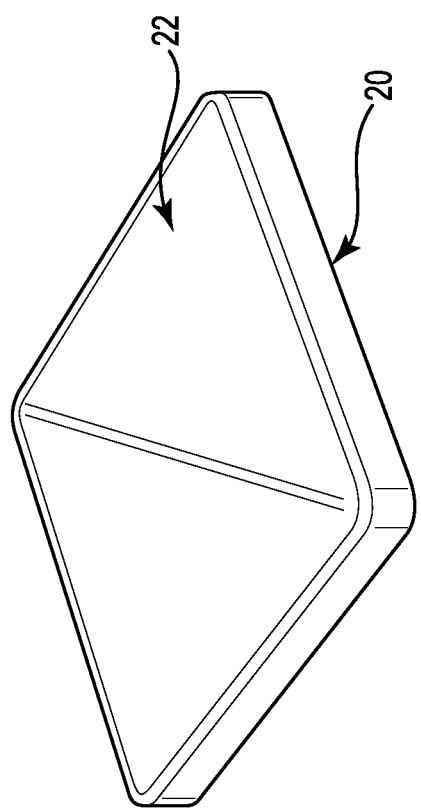
FIG. 2 illustrates a BVOH and trehalose composition three-dimensionally printed onto an ultra-highmolecular weight polyethylene build plate.

This disclosure relates to compositions and methods for producing and using water soluble polymer compositions. Such water soluble polymer compositions can solve several problems in conventional additive manufacturing. As illustrated in FIGS. 1 and 2, water soluble polymer compositions can be printed on a standard build plate. FIG. 1 shows butenediol vinylalcohol copolymer (BVOH) and trehalose composition 12 printed on a standard acrylonitrile butadiene styrene (ABS) and nylon build plate 10. FIG. 2 shows BVOH and trehalose composition 22 printed on to ultra-high molecular weight polyethylene build plate 20. The BVOH/trehalose composition shown in FIG. 2 adhered well to the build plate during printing.

Figure 3:
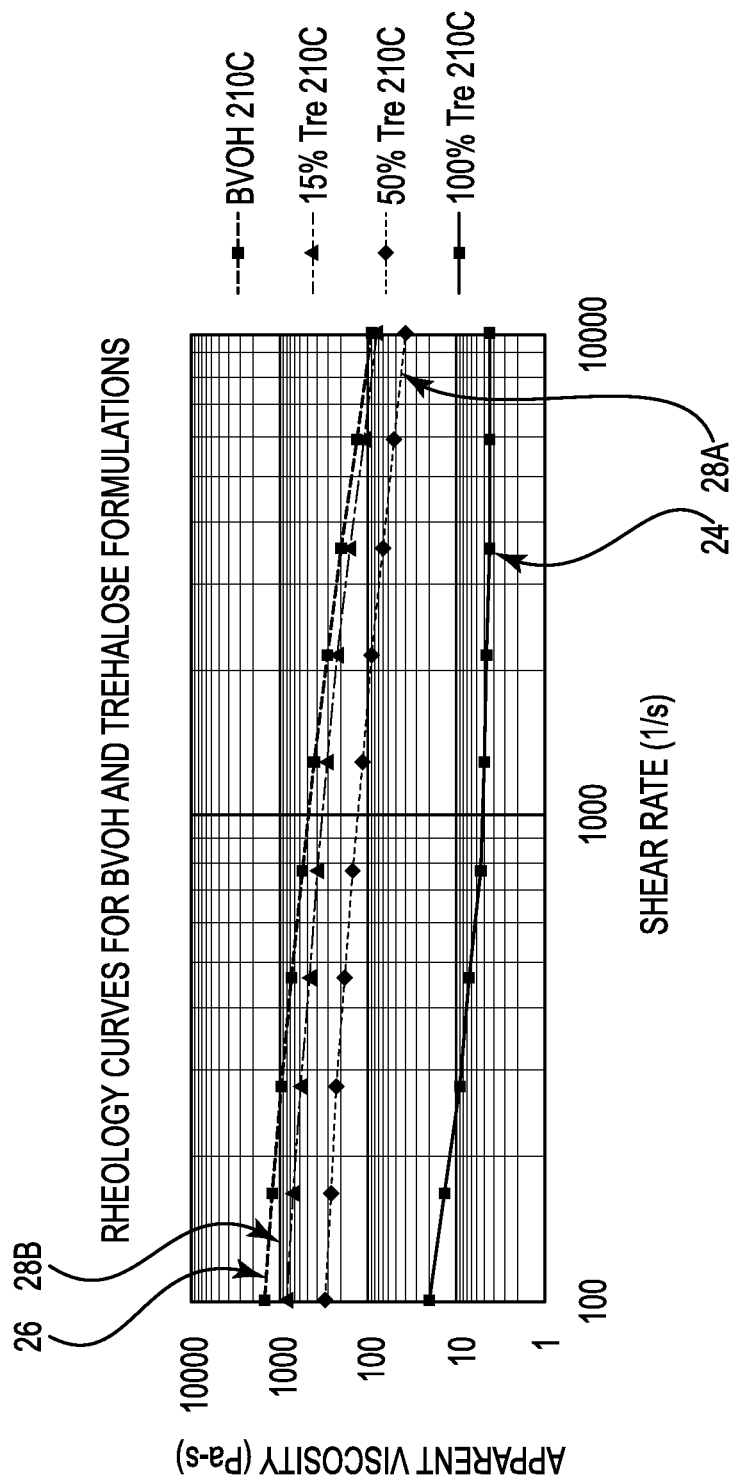
FIG. 3 is a plot of rheology curves for BVOH and trehalose formulations.

FIG. 3 is a rheology curve plot comparing the apparent viscosity (Pa·s) as a function of shear rate (1/s) at a temperature of 210° C. FIG. 3's plot includes curve 24 for 100 wt % trehalose, curve 26 for 100 wt % BVOH, curve 28A for 50/50 wt % BVOH/trehalose, and curve 28B for 85/15 wt % BVOH/trehalose. As illustrated in FIG. 3, a BVOH and trehalose blend can exhibit enhanced rheological properties over pure trehalose. In particular, BVOH can enhance the melt viscosity of trehalose, can expand processing and printability temperature window(s), and can enhance ductility of the mixture.

Figure 4A:
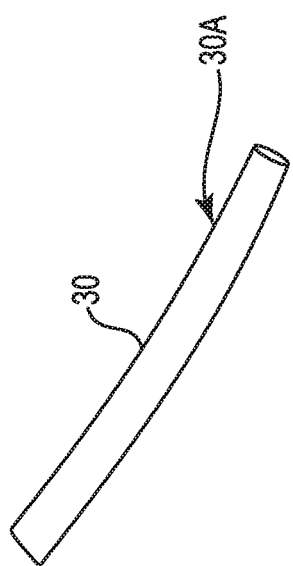
FIG. 4A shows a 50/50 wt % BVOH/trehalose composition filament before stretching.

FIGS. 4A and 4B show 50/50 wt % BVOH/trehalose composition filament 30 before, as 30A, and after stretching, as 30B. FIGS. 4A and 4B, for example, illustrate the suitability of the disclosed water soluble polymer compositions as a feedstock (here, a filament) for FDM. FIG. 4A shows that BVOH/trehalose composition 30A can be brittle and breaks when trying to bend it. But FIG. 4B shows that stretching has aligned the BVOH chains, and significantly increased the toughness and flexibility while reducing the brittleness of the material. For FDM printing, having flexibility can be critical to ensuring the material feeds uniformly during the FDM 3D printing process, ultimately leading to better prints. Stretching of the BVOH/trehalose composition can also induce crystallinity in the BVOH polymer.

A variety of water soluble polymers may be used in water soluble polymer compositions. Non-limiting examples of water soluble polymers include coagulants, such as quaternary polyamines, polydiallyl ammonium chloride (poly-DADMAC), and dicyandiamide resins; flocculants, such as nonionic, anionic, and cationic materials; amphoteric polymers; polyethyleneimines; polyamide-amines; polyamine-based polymers; polyethylene oxides; sulphonated compounds; polyvinylpyrrolidone; polylactic acid; polylactones; polyacrylate-type dispersants; poly alcohols; cellulose derivatives; or combinations thereof. Non-liming examples of commercially available water soluble polymers include BVOH, sold as NICHIGO G-POLYMER™ by Nippon Goshei, poly-2-ethyloxazoline, sold as AQUAZOL™ by Polymer Chemistry Innovations, Inc., and hydroxypropyl methylcellulose, sold as AFFINISOL™ by Dow Chemical Co.

A variety of sugars may be used in the disclosed water soluble polymer compositions. Such sugars can enhance solubility and adhesion to hydrophobic polymers. Non-limiting examples of sugars include monosaccharides, disaccharides, oligosaccharides, polysaccharides, or derivatives thereof. A non-limiting example of a useful sugar is trehalose, sold as TREHA™ sugar by Cargill. Other exemplary sugars include, but are not limited to, sucrose, lactulose, lactose, maltose, cellobiose, chitobiose octaacetate, kojibiose, nigerose octaacetate, isomaltose, isomaltulose, beta, beta-trehalose, alpha,beta-trehalose, sophorose, laminaribiose, gentiobiose, turanose, maltulose, palatinose, gentiobiulose, mannobiose, melibiose, melibiulose, ructinose, ructinulose, melezitose or xylobiose. Other exemplary sugars and their respective melting points are shown in Table 1.

TABLE 1

SUGAR MELTING POINTS

| Material | Melting Point (° C.) |
|---|---|
| chitobiose octaacetate | 304-405 |
| laminaribiose | 253 |
| cellobiose | 225 |
| trehalose | 203 |
| lactose | 203 |
| sophorose | 196-198 |
| xylobiose | 195 |
| gentiobiose | 190-195 |
| sucrose | 186 |
| kojibiose | 175 |
| lactulose | 169 |
| Maltose (anhydrous) | 160-165 |
| meletiose | 152 |
| turanose | 142 |
| palatinose | 125-128 |
| maltulose | 125 |
| isomaltulose | 123 |
| melibose | 85 |

A water soluble polymer composition can employ a variety of other polymers, which may miscible or non-miscible with water soluble polymer compositions. Non-limiting examples of polymers that can be used to make such an article include high density polyethylene (HDPE), low density polyethylene (LDPE), linear low density polyethylene (LLDPE), crosslinked polyethylene (PEX), vulcanized rubber, functional polyolefin copolymers including polyolefin based ionomers, polypropylene (PP), polyolefin copolymers (e.g., ethylene-butene, ethylene-octene, ethylene vinyl alcohol), polystyrene, polystyrene copolymers (e.g., high impact polystyrene, acrylonitrile butadiene styrene copolymer), polyacrylates, polymethacrylates, polyesters, polyvinylchloride (PVC), fluoropolymers, polyamides, polyether imides, polyphenylene sulfides, polysulfones, polyacetals, polycarbonates, polyphenylene oxides, polyurethanes, thermoplastic elastomers (e.g., SIS, SEBS, SBS), epoxies, alkyds, melamines, phenolics, ureas, vinyl esters, cynate esters, silicones, or combinations thereof A water soluble polymer composition can also employ a variety of additives, which may also be miscible or non-miscible with the water soluble polymer composition. Non-limiting examples of suitable additives include antioxidants, light stabilizers, fibers, blowing agents, foaming additives, antiblocking agents, heat reflective materials, heat stabilizers, impact modifiers, biocides, antimicrobial additives, compatibilizers, plasticizers, tackifiers, processing aids, lubricants, coupling agents, thermal conductors, electrical conductors, catalysts, flame retardants, oxygen scavengers, fluorescent tags, inert fillers, minerals, and colorants. Additives may be incorporated into a water soluble polymer composition as a powder, liquid, pellet, granule, or in any other extrudable form. The amount and type of conventional additives in the water soluble polymer composition may vary depending upon the polymeric matrix and the desired properties of the finished composition. In view of this disclosure, persons having ordinary skill in the art will recognize that an additive and its amount can be selected in order to achieve desired properties in the finished material. Typical additive loading levels may be, for example, approximately 0.01 to 5 wt % of the composition formulation.

Various water soluble polymer and sugar compositions, including optional additional polymers and additives, can be employed in a water soluble polymer composition. The disclosed water soluble polymer composition may, for example, include at least about 10 wt % water soluble polymer, or at least about 20 wt % water soluble polymer, or at least about 40 wt % water soluble polymer, and up to about 50 wt % water soluble polymer, or up to about 85 wt % water soluble polymer, or up to about 90 wt % water soluble polymer. In another example, the final composition may include at least about 0.1 wt % sugar, or at least about 1 wt % sugar, or at least about 2 wt % sugar, or at least about 5 wt % sugar, or at least about 20% sugar, and up to about 50 wt % sugar, or up to about 75 wt % sugar, or up to about 90 wt % sugar, or about to about 95 wt % sugar, or up to about 99.9 wt % sugar.

In preferred embodiments, water soluble polymer compositions can include BVOH and trehalose. BVOH tends to be both water soluble and stable above its melting point. In addition, trehalose tends to be a thermodynamically and kinetically stable, non-reducing, and natural disaccharide. The combination can provide numerous benefits. As illustrated in FIG. 3, BVOH and trehalose can exhibit enhanced rheological properties over pure trehalose. Also, trehalose can enhance water solubility of the composition, can enhance adhesion to hydrophobic polymers (e.g., polyolefins), can increase stiffness at higher temperatures, can improve adhesion to common/typical build plate materials, and can increase brittleness with higher loading levels, which may allow easier breakaway of or from the 3D printed part.

In such preferred embodiments, the disclosed water soluble polymer composition may, for example, include at least about 10 wt % BVOH, at least about 20 wt % BVOH, or at least about 40 wt % BVOH, and up to about 50 wt % BVOH, or up to about 85 wt % BVOH, or up to about 90 wt % BVOH. In another example, the final composition may include at least about 0.1 wt % trehalose, or at least about 1 wt % trehalose, or at least about 2 wt % trehalose, or at least about 5 wt % trehalose, or at least about 20% trehalose, and up to about 50 wt % trehalose, or up to about 75 wt % trehalose, or up to about 90 wt % trehalose, or about to about 95 wt % trehalose, or up to about 99.9 wt % trehalose.

Water soluble polymer compositions, including any optional polymers and additives, can be prepared by mixing. Depending on the selected polymeric matrix, this can be done using a variety of mixing processes known to those skilled in the art. The water soluble polymer, sugar, and optional additives can be combined together by any of the blending means usually employed in the plastics industry, such as with a compounding mill, a Banbury mixer, or a mixing extruder. In another preferred embodiment, a vented twin screw extruder is utilized. The materials may be used in the form, for example, of a powder, a pellet, or a granular product. The mixing operation is most conveniently carried out at a temperature above the melting point or softening point of the water soluble polymer, sugar, or both the water soluble polymer and sugar. The resulting melt processed water soluble polymer composition can be extruded directly into the form of the final product shape, or can be pelletized or fed from the melt processing equipment into a secondary operation to pelletize the composition (e.g., using a pellet mill or densifier) for later use. In another embodiment, the water soluble polymer composition and optional additives can be 3D printed.

Water soluble polymer compositions can provide a number of advantages. One key advantage is that the dissolution rate (e.g., mg/min as calculated according to Dissolution Method Test 2) can be increased significantly. In some embodiments, the dissolution rate is increased by more than 20% when compared to the water soluble polymer component, and another embodiment the dissolution rate is increased by more than 50% when compared to the water soluble polymer component, in another embodiment the dissolution rate is increased by more than 75% when compared to the water soluble polymer component. In other embodiments, the dissolution rate of the water soluble polymer composition is at least 400 mg/min, in a preferred embodiment the dissolution rate is at least 600 mg/min, in a most preferred embodiment the dissolution rate is at least 800 mg/min. Water soluble polymer compositions can also be substantially stable at build chamber temperatures of at least about 140° C., or at least about 150° C., or at least about 170° C., or at least about 190° C., or at least about 210° C., and up to about 300° C.

The disclosed water soluble polymer composition can undergo additional processing for desired end-use applications.

Water soluble polymer compositions can be used as a feedstock in fused deposition modeling (FDM). In some preferred embodiments, the feedstock may be a filament but other feedstocks (e.g., film, sheet, shaped profile, powder, pellet, etc.) can also be used. While some water soluble polymer compositions with higher sugar loading may be well-suited for use as a water soluble support in some additive manufacturing processes, such compositions may be too brittle for use in some FDM processes. In particular, feedstock having such compositions may break when pulled through the path and pushed into a heated nozzle. It may be necessary to draw down or stretch the composition while it is cooled to enhance the toughness. By drawing down or stretching the composition, the water soluble polymer chains as well as the sugar become aligned in the direction of pull, which ultimately toughens the composition making it possible to turn the composition into a feedstock that does not break, or is much less likely to break, during the FDM 3D printing process.

Without intending to be limited by theory, drawing can increase the crystallinity of the extruded feedstock through a stress alignment phenomenon. It is well known in additive manufacturing that it can be challenging to print semi-crystalline and crystalline polymers because they have a tendency to shrink in the build chamber when allowed to relax. This can result in part warpage and curling. Surprisingly, water soluble polymer compositions, despite being semi-crystalline, provide printed parts with low warpage. This may be in part due to the excellent adhesion of the water soluble composition to a variety of build materials and to the build plate. The disclosed water soluble polymer compositions also show remarkable adhesion properties to a wide range of build plates and build materials including: polyethylene, polypropylene, ultra high molecular weight polyethylene (UMHWD), polytetrafluoroethylene. polyamide (e.g., Nylon 6, Nylon 6.6, Nylon 12), polyimide (e.g, Kapton), polyether-imide (PEI), polyethteretherkeetone (PEEK), polyacrylonitrile-butadiene-stryrene (ABS), polylactic acid (PLA), polyacrylic (e.g, PMMA), polycarbonate (PC) and others.

In some embodiments, drawing can occur at temperatures near or just below the glass transition temperature of the water soluble polymer. In one embodiment, the draw ratio of the feedstock process is at least between 1.5 and 10:1, in a preferred embodiment, the draw ratio of the feedstock process is between 1.5 and 5:1, in a most preferred embodiment, the draw ratio is between 1.5 and 3:1. Such alignment can increase the crystallinity of the extruded feedstock and dramatically improve certain mechanical properties (e.g., tensile strength and ductility) that enable it to function in a printer. The drawing can be achieved by a number of methods. In some embodiments, the feedstock can be conventionally extruded, and then processed using a godet operation that can heat and draw the filament at the proper temperatures. This operation can be performed inline or offline. Alternatively, water soluble polymer compositions can be extruded and cooled, and reheated between two or more pullers that are operating at different pull speeds to draw the filament. It is also possible to precisely cool the extruded composition and draw inline using an appropriate downstream extrusion design. In view of this disclosure, person of ordinary skill in the art will appreciate other ways of achieving desired draw ratios and chain alignment to produce a feedstock, such as a filament, of the disclosed water soluble polymer compositions.

In another embodiment, a feedstock can include a water soluble polymer that does not contain a sugar. In this instance, the water soluble polymer is semi-crystalline and is substantially stable at temperatures above 140° C. and has water solubility of at least 100 mg/min (per Dissolution Test Method 2). The feedstock of the water soluble polymer of this composition is optionally drawn to improve its toughness. In a preferred embodiment, the draw ratio is at least 1.5:1 for compositions containing a water soluble polymer. Preferred water soluble polymers include BVOH (commercially available as NICHIGO G-POLYMER™ from Nippon Goshei. Preferred grades include Nichigo G8049 and Nichigo G1028.

In another embodiment, the disclosed water soluble polymer composition may be converted into articles using conventional melt processing techniques, such as compounding, extrusion, molding, and casting, or additive manufacturing processes. For use in additive manufacturing processes, a variety of additive manufacturing devices can employ water soluble polymer compositions, as, for example, a support or build material. Non-limiting examples of such additive manufacturing devices include, but are not limited to, the Dremel DigiLab 3D45 3D Printer, LulzBot Mini 3D Printer, MakerBot Replicator+, XYZprinting da Vinci Mini, Formlabs Form 2, Ultimaker 3, Flashforge Finder 3D Printer, Robo 3D R1 +Plus, Ultimaker 2+. Water soluble polymer compositions can be selectively removed as either a build or support material (e.g., by dissolution or mechanically) manually, automatically (e.g., computer controlled dissolution), or by some combination thereof.

A variety of polymers and additives, such as those already disclosed above, can be added to the disclosed water soluble polymer composition to form an article.

The disclosed compositions and articles have broad utility in a number of industries, including, but not limited to, additive manufacturing. These compositions and articles can provide significant value to plastics compounders and converters. The disclosed compositions and articles offer enhanced solubility and adhesion to hydrophobic polymers, tunable rheological properties, and increased stiffness at higher temperatures.

In the following Examples, all parts and percentages are by weight unless otherwise indicated.

EXAMPLES

TABLE 2

| \multicolumn{2}{c}{MATERIALS} | |
| --- | --- |
| Material | Supplier |
| Water Soluble Polymer 1 (WSP 1) | NICHIGO G-POLYMER ™, 8049, water soluble polymer, Butenediol vinylalcohol (BVOH), commercially available from Nippon Goshei (Osaka, Japan) |
| Water Soluble Polymer 2 (WSP 2) | AQUAZOL ™ 50, water soluble polymer, poly-2-ethyloxazoline (PEOx), commercially available from Polymer Chemistry Innovations, Inc (Tucson, AZ) |
| Water Soluble Polymer 3 (WSP 3) | AFFINSOL ™ 100LV, water soluble polymer, hydroxypropyl methylcellulose (HPMC), commercially available from Dow Chemical (Midland, MI) |
| Water Soluble Polymer 4 (WSP 4) | NICHIGO G-POLYMER ™, 1028, water soluble polymer, Butenediol vinylalcohol (BVOH), commercially available from Nippon Goshei (Osaka, Japan) |
| PEI | ULTEM ™ 9085, polyetherimide, commercially available from Sabic, Inc. |
| Sugar 1 | TREHA ™, sugar, trehalose,, commercially available from Cargill (Hopkins, MN) |
| Sugar 2 | Sugar, sucralose, commercially available from Tate and Lyle (McIntosh, Alabama) |
| Sugar 3 | sugar, sucrose, commercially available from Cargill (Hopkins, MN) |

TABLE 3

EXPERIMENTAL FORMULATIONS

| Formulation | WSP 1 | WSP 2 | WSP 3 | WSP 4 | Sugar 1 | Sugar 2 | Sugar 3 |
|---|---|---|---|---|---|---|---|
| 1  | 100 |    |    |     |    |    |    |
| 2  |     |    |    | 100 |    |    |    |
| 3  | 95  |    |    |     | 5  |    |    |
| 4  | 85  |    |    |     | 15 |    |    |
| 5  | 75  |    |    |     | 25 |    |    |
| 6  | 50  |    |    |     | 50 |    |    |
| 7  |     |    |    | 85  | 15 |    |    |
| 8  | 10  | 20 | 30 |     | 20 |    | 20 |
| 9  |     | 85 |    |     |    | 15 |    |
| 10 |     | 50 |    |     |    |    | 50 |
| 11 | 20  | 20 | 20 |     | 20 | 20 |    |
| 12 |     |    | 50 | 50  |    |    |    |
| 13 | 10  | 20 | 10 |     | 20 | 20 | 20 |
| 14 |     |    | 90 |     |    |    | 10 |
| 15 |     | 35 | 35 |     | 30 |    |    |
| 16 | 40  |    |    |     | 50 | 5  | 5  |
| 17 | 10  |    |    |     | 80 | 10 |    |

Sample Preparation: Formulations 1-17

Each of Formulations 1-17 was prepared according to the weight ratios in Table 3 (Formulations 3-17 were first blended in a plastic bag) and gravimetrically fed into a 27 mm twin screw extruder (52:1 L:D, commercially available from ENTEK™ Extruders, Lebanon, Oreg.). Compounding was performed using the following temperature profile in zones 1-13: 100, 350, 400, 400, 400, 400, 400, 400, 400, 400, 400, 400, and 400 degrees Fahrenheit (about 38, 177, 204, 204, 204, 204, 204, 204, 204, 204, 204, 204, and 204 degrees Celsius, respectively). The extruder's screw speed was about 300 rpm, and the output rate was about 10 kg/hr. The mixture was then extruded onto an air cooled belt conveyor, pelletized into approximately 2.5 mm×2.5 mm cylindrical pellets, and collected in a plastic bag.

Example 1: Printing Formulations 1-2, 4, and 6-7

A sample from each of Formulations 1-2, 4, and 6-7 was printed into 8 cm³ cube using an ARBURG™ Freeformer (commercially available from Arburg GmbH, Lossburg, Germany). Formulations 1-2, 4, and 6-7 were dried at 90° C. for 8 hours prior to printing. After drying, each of Formulations was individually loaded into the Freeformer and printed into a cube that was 2 cm×2 cm×2 cm using the following parameters: a nozzle size of 0.2 mm, a layer thickness of 0.2 mm, a part density of approximately 35%, a discharge of 80%, a droplet aspect ratio of 2.2. For each Formulation, the nozzle temperatures were 207° C., 200° C., 207° C., 190° C. and 207° C.; the back pressure was 80 bar; and the print speed was 40 mm/s. A build chamber temperature of 120° C. was used for printing Formulations 1-2, 4, and 7; a build chamber temperature of 80° C. was used for printing Formulation 6.

Example 2: Printing PEI and Formulation 6

PEI and Formulation 6 were printed using an ARBURG™ Freeformer (commercially available from Arburg GmbH, Lossburg, Germany). PEI was dried at 100° C. for 8 hours and water soluble polymer Formulation 6 was dried at 90° C. for 8 hours. After drying, the materials were loaded into the Freeformer and a PEI part that was a 25 mm square, 0.4 mm thick, with an 11.50 mm overhang, 0.4 mm thick, attached to the square base by a 1 mm thick arm was printed using the following parameters: a nozzle size of 0.20 mm, a layer thickness of 0.2 mm, a part density of approximately 90% for both the part and support material, a discharge of 90 percent, and a droplet aspect ratio of 1.5. PEI was printed with a nozzle temperature of 305° C., and a dosing back pressure of 50 bar. Formulation 6 was printed with a nozzle temperature of 207° C., and a dosing back pressure of 80 bar. A build chamber temperature of 145° C. and a print speed was 20 mm/s on infill was used.

Example 3: Printing PEI and Formulation 2

As in Example 2, PEI and Formulation 2 were printed using an ARBURG™ Freeformer (commercially available from Arburg GmbH, Lossburg, Germany). PEI was dried at 100° C. for 8 hours and water soluble polymer Formulation 2 was dried at 90° C. for 8 hours. After drying, the materials were loaded into the Freeformer and a PEI part that was a 25 mm square, 0.4 mm thick, with an 11.50 mm overhang, 0.4 mm thick, attached to the square base by a 1 mm thick arm was printed using the following parameters: a nozzle size of 0.20 mm, a layer thickness of 0.2 mm, a part density of approximately 90% for both the part and support material, a discharge of 90 percent, and a droplet aspect ratio of 1.5. PEI was printed with a nozzle temperature of 305° C., and a dosing back pressure of 50 bar. Formulation 2 was printed with a nozzle temperature of 207° C., and a dosing back pressure of 80 bar. A build chamber temperature of 145° C. and a print speed was 20 mm/s on infill was used.

Example 4: Filament Preparation of Formulations 4 and 6-7

Filament preparation for Formulations 6-7 was conducted according to two Procedures, A and B. In Procedure A, pellets from Formulations 6-7 were dried for four hours and then extruded at a screw speed of 20 rpm, a temperature profile of 180° C. for all extruder zones, and an output rate of 5 kg/hr. The resulting filament was directed onto a heated multi-roll godet downstream unit, at 90° C. The godet-heated filament of Formulation 6 was the drawn from its initial draw ratio to final a draw ratio of 2:1. The godet-heated filament of Formulation was drawn from its initial draw ratio to a final draw ratio of 1.5:1.

In Procedure B, pellets from Formulations 4 and 7 were extruded using a 1.50" single screw extruder (commercially available from Automated Manufacturing Systems, West Palm Beach, Fla.) at a screw speed of 20 rpm and output rate of 5 kg/hr. All temperature zones after the feed throat were heated to 200° C. The extruded filament was then cooled to approximately 90-120° C. with air and then drawn using a downstream puller and winding unit to provide a final draw ratios of approximately 2:1. The resulting filament was approximately 1.75 mm in thickness.

Example 5: Makerbot Filament Formulation 4

A 1.75 mm thick filament of Formulation 4, produced according to Procedure B, was printed on a MAKERBOT REPLICATOR™ 2X (commercially available from Maker-Bot Industries, LLC) using the following conditions. The filament was directly fed into the Makerbot extruder. Extruder temperature was 190° C. Conditions to print a stock file that comes with the Makerbot software (shark) was utilized.

Dissolution Method Test 1: Formulations 1 and 3-5

For each of Formulations 1 and 3-5, a 2.5 gram pellet sample was place in about 50 mL of deionized water at about 70° C. The dissolution time was reported at the time when the sample was completely dissolved, such that there were no observable pellets. The results of are provided in Table 4.

TABLE 4

DISSOLUTION METHOD TEST 1 RESULTS

| Formulation | Dissolution Time (min) |
|---|---|
| 1 | 16 |
| 3 | 14 |
| 4 | 10 |
| 5 | 8 |

Dissolution Method Test 2: Formulations 1-2, 4, and 6-7

The printed cube samples for each of Formulations 1-2, 4, and 6-7, as described in Example 1, was subjected to Dissolution Method Test 2, described here as follows. A cube with a volume of about 8 cm³ was placed into a 250 mL beaker filled with 100 mL of 70° C. deionized water. Every minute, for about 15 minutes, a 2 mL aliquot was sampled, dried for 24 hours and the amount of dissolved material was gravimetrically measured. The dissolution rate was then calculated using the following equations.

Dissolved Mass(mg) at time $(t) =$ $$\left(\frac{\text{Residual Mass (mg)}_t}{\text{Aliquot Volume (ml)}_t}\right) \text{Total Volume (ml)}_t$$

Fraction Dissolved at time $(t) = \frac{\text{Dissolved Mass(mg) at time } (t)}{\text{Initial Mass of Cube (mg)}}$ Empiric Model Calculations (Weibull):

$$\text{Calculated Fraction Dissolved at time } (t) = \frac{M_t}{M_i} = 1 - e^{\left[\frac{-(t-T_i)^b}{a}\right]}$$

Where $M_t$ is the mass dissolved at time t, $M_i$ is the initial cube mass, a is the scale parameter of the process, and b defines the shape of the dissolution curve, and $T_i$ is the lag time before dissolution onset (typically this value is zero). From this empirical model an estimate of the time interval $(T_d)$ necessary to dissolve about 63.2% of the cube can be calculated through the following relationship:

$$T_d(63.2\%) = \sqrt[3]{a} \text{ minutes}$$

Although this is an empiric model, it produces an approximate dissolution rate based on the initial mass of the cube $(M_i)$, and the time interval it takes to dissolve about 63.2% of the sample.

$$\text{Approximate Dissolution Rate (mg/min)} = \frac{(0.632 * M_t)}{T_d} = \frac{(0.632 * M_t)}{\left(\sqrt[3]{a}\right)}$$

The results are provided in Table 5.

TABLE 5

DISSOLUTION METHOD TEST 2 RESULTS

| Formulation | % Dissolution at 1 min | % Dissolution at 5 min | % Dissolution at 10 min | 70° C. Dissolution Rate (mg/min) |
|---|---|---|---|---|
| 1 | 1 | 40 | 90 | 340 |
| 2 | 5 | 50 | 70 | 390 |
| 4 | 5 | 75 | 95 | 480 |
| 6 | 35 | 95 | 100 | 1440 |
| 7 | 11 | 60 | 80 | 460 |

Mandrel Knot Test of Formulations 4 and 6

Filament produced using Formulations 4 and 6 was subjected to mandrel knot testing. A 12" long piece of filament was tied into a single knot over several HDPE cylindrical mandrel of varied diameter (3", 2" and 1") and pulled taught by hand. A pass is defined as the filament not breaking during this test. The results are shown below in Table 6.

TABLE 6

MANDREL KNOT TEST RESULTS

| Formulation | Draw Ratio | 1" Mandrel | 2" Mandrel | 3" Mandrel |
|---|---|---|---|---|
| 4 | 0 | Fail | Fail | Fail |
| 4 | 1.5:1 | Pass | Pass | Pass |
| 6 | 0 | Fail | Fail | Fail |
| 6 | 3:1 | Pass | Pass | Pass |

DSC Characterizations

A differential scanning calorimetry (DSC) study was performed on Formulation 6 filaments with and without drawing. Table 7 shows that the enthalpy of fusion for Formulation 6 increases from 1.7 J/g to 8.7 J/g upon drawing the filament at a draw ratio of ~3:1. However, upon removal of the thermal history, which was done by heating the stretched filament above melting temperature, cooling to room temperature, and then re-heating above melting, the enthalpy decreased back to that observed for the sample that was not drawn. This behavior of stress-induced crystallization is evident by DSC, which, to one skilled in the art would suggest this material is semi-crystalline in nature.

TABLE 7

DSC ON FORMULATION 6 FILAMENT

| Formulation | Processing Conditions | Enthalpy of Fusion (J/g) | Enthalpy of Fusion (J/g) after cooling and reheating |
|---|---|---|---|
| 6 | No draw | 1.7 | 1.7 |
| 6 | ~3:1 draw | 8.7 | 1.7 |

Additionally, as shown in Table 8, DSC was performed on Sugar 1 and Formulations 1-2 and 6-7. Table 8's results show that Formulations 6 and 7 are miscible blends. Specifically, only one glass transition and melting temperature is observed.

TABLE 8

DSC FOR SUGAR 1 AND FILAMENT FORMULATIONS 1-2 AND 6-7

| Formulation | Glass Transition Temperature (° C.) | Melting Temperature (° C.) | Number of Melting Transitions |
|---|---|---|---|
| 1 | 73 | 186 | 1 |
| 2 | 75 | 205 | 1 |
| Sugar 1 | N/A | 196 | 1 |
| 6 | 91 | 172 | 1 |
| 7 | 79 | 179 | 1 |

Having thus described particular embodiments, those of skill in the art will readily appreciate that the teachings found herein may be applied to yet other embodiments within the scope of the claims hereto attached.

What is claimed is:

1. A water soluble polymer composition comprising:
a semi-crystalline water soluble polymer; and
a sugar having a melting point of at least 186° C.;
wherein the semi-crystalline water soluble polymer and the sugar are melt processable and substantially miscible and form a water soluble polymer composition; and
wherein the water soluble polymer composition is substantially dry.

2. The water soluble polymer composition of claim 1, wherein the water soluble polymer is derived from a poly alcohol, a polyvinylpyrrolidone, or a combination thereof.

3. The water soluble polymer composition of claim 2, wherein the water soluble polymer is derived from a polyvinyl alcohol.

4. The water soluble polymer composition of claim 1, wherein the sugar is trehalose.

5. The water soluble polymer composition of claim 1, wherein the water soluble polymer composition forms a pellet, micropowder, or filament.

6. The water soluble polymer composition of claim 1, wherein the water soluble polymer composition is substantially stable at a build chamber temperature of at least about 80° C.

7. The water soluble polymer composition of claim 1, wherein the water soluble polymer composition is substantially stable at a build chamber temperature of at least about 120° C.

8. The water soluble polymer composition of claim 1, wherein the water soluble polymer composition is substantially stable at a build chamber temperature of at least about 140° C.

9. The water soluble polymer composition of claim 1, wherein the water soluble polymer composition is substantially stable at a build chamber temperature of at least about 150° C.

10. The water soluble polymer composition of claim 1, wherein the water soluble polymer composition is substantially stable at a build chamber temperature of at least about 170° C.

11. The water soluble polymer composition of claim 1, wherein the water soluble polymer composition is substantially stable at a build chamber temperature of at least about 190° C.

12. The water soluble polymer composition of claim 1, wherein the water soluble polymer composition is substantially stable at a build chamber temperature of at least about 210° C.

13. The water soluble polymer composition of claim 1, further comprising a plasticizer.

14. A three-dimensional printed article comprising:
a three-dimensional printed object generally disposed on a substantially horizontal build plate in a build chamber; and
one or more soluble supports positioned about and supporting one or more portions of the three-dimensional printed object, the soluble supports comprising a water soluble polymer composition;
wherein the water soluble polymer composition is formed by melt processing a semi-crystalline water soluble polymer and a sugar having a melting point of at least 186° C.; and
wherein the semi-crystalline water soluble polymer and the sugar are substantially miscible.

15. The three-dimensional printed article according to claim 14, wherein one or more soluble supports are substantially stable at a build chamber temperature of at least about 80° C.

16. The three-dimensional printed article according to claim 14, wherein one or more soluble supports are substantially stable at a build chamber temperature of at least about 120° C.

17. The three-dimensional printed article according to claim 14, wherein one or more soluble supports are substantially stable at a build chamber temperature of at least about 190° C.

18. The three-dimensional printed article according to claim 14, wherein one or more soluble supports are substantially stable at a build chamber temperature of at least about 210° C.

* * * * *